Aug. 31, 1965 R. E. ARSENEAU ETAL 3,204,043

HIGH SPEED ELECTRONIC SWITCHING TELEPHONE SYSTEM

Filed Dec. 19, 1962 5 Sheets-Sheet 1

INVENTORS
ROGER E. ARSENEAU
JOHN BEREZNAK

BY [signature]
ATTORNEY

HIGH SPEED ELECTRONIC SWITCHING TELEPHONE SYSTEM

Filed Dec. 19, 1962 5 Sheets-Sheet 3

HIGH SPEED ELECTRONIC SWITCHING TELEPHONE SYSTEM

Filed Dec. 19, 1962

5 Sheets-Sheet 4

Aug. 31, 1965 R. E. ARSENEAU ETAL 3,204,043

HIGH SPEED ELECTRONIC SWITCHING TELEPHONE SYSTEM

Filed Dec. 19, 1962 5 Sheets-Sheet 5

United States Patent Office 3,204,043
Patented Aug. 31, 1965

3,204,043
HIGH SPEED ELECTRONIC SWITCHING TELEPHONE SYSTEM

Roger E. Arseneau, Elk Grove Village, and John Bereznak, Oak Lawn, Ill., assignors to International Telephone and Telegraph Corporation
Filed Dec. 19, 1962, Ser. No. 245,728
15 Claims. (Cl. 179—18)

This invention relates to electronic switching telephone systems and more particularly to extremely high speed switching systems.

At one time, electromechanical telephone switching systems provided capabilities which enabled switching at speeds much faster than subscribers can manipulate their telephone dials. Therefore, there was then no pressing need for faster switching. However, as society became more complex, greater demands were placed on telephone switching systems with a result that systems became very complex. Soon it became fashionable to talk about the need for switching operations which could be made faster than electromechanical parts can move. Thereafter, came a period of great effort to develop electronic switching systems, not bound by the limitations imposed by the inertia, friction, and wear of moving parts. One result has been a recent development of an "Electronic Switching Telephone System," described in U.S. patent application, Serial No. 181,626, filed March 22, 1962, by Roger E. Arseneau, John Bereznak, and Peter E. Osborn, and assigned to the assignee of this invention.

The Arseneau, Bereznak, and Osborn system functions extremely well at speeds which so far exceeded previously available electromechanical speeds that one would think there would be no need for further increasing switching speeds for years to come. However, as fantastic as it may at first appear to be, a society more complex than the society which forced development of electronic switching has already placed demands exceeding the switching speed capabilities of that system.

Perhaps a specific example might highlight the current needs. According to this example, a far flung network of transmission lines interconnect widely scattered agencies which must act in concert during periods of national disaster. To interconnect any two or more points, it may be necessary to switch calls through three or more tandem offices. Moreover, to bring all required agencies into a coordinated, simultaneous action, it may be necessary to connect a great number of subscriber stations into one conference call—also through many tandem offices, if need be. Each of these, and other similar calls, must be completed in a period of time which is no longer than the time required to select and push or operate a single key or button. This time period may be much less than a second.

The enormity of these demands becomes more apparent when one stops to realize that the described system is not a direct wire push button controlled intercommunication system. It is a switching system that must select and complete an idle one among many busy paths through a switching network. Moreover, during a national disaster of the type contemplated, all persons having authority to command a coordinated action may simultaneously rush to push a button. Thus, all these conference, tandem, and other calls must be completed almost instantaneously during saturation switching conditions. Moreover, the fear generated by the disaster could lead system users to make operational errors; therefore, the system should be foolproof.

Accordingly, an object of this invention is to provide new and improved electronic switching telephone systems and more particularly to provide extremely fast operating systems. Specifically, an object is to provide systems capable of establishing calls through selective switching networks in each of a minimum of three tandem exchanges during a maximum time period which is in the order of the time required to operate a push button or other key.

Another object is to establish conference calls—with a minimum capability of five lines per conference call—substantially simultaneously through one or more selective switching networks either in a single office or in tandem offices.

A further object is to provide for a number of individual keys per telephone, there being one key for each of a plurality of arbitrarily assigned calling numbers, including preset conference calls. In this connection, an object is to provide means in a central switching office for giving each subscriber the ability to select any desired calling telephone number for connection to the keys at his particular telephone set.

Another object is to provide electronic switching systems having greatly improved electrical characteristics. Here an object is to eliminate noise sometimes caused heretofore by useless searching through an electronic crosspoint switching network.

A further object is to accomplish these and other objects at a minimum expense. In particular an object is to provide electronic switching system at a price that is competitive with electromechanical switching systems giving similar services.

This invention is used in connection with an electronic switching telephone system for selectively interconnecting any of a plurality of subscriber lines with any of a plurality of register or link circuits. These connections are completed through the use of self-seeking, current controlled, electronic switching networks of PNPN diode crosspoints. A plurality of common registers control the extension of these connections through the network, usually on a register per call connection basis. After the call is completed, the connection is transferred from a controlling register to a link circuit where a voice gate closes and supervision is provided for the duration of the call. After such transfer, the register is free to serve the next call.

In accordance with one aspect of the invention, each line in the system is identified by a cyclically recurring time frame which is produced by a free-running scanner that normally operates at a speed which is too fast to complete a connection through the network. When a subscriber line goes off-hook, a detector operates during the time frame which identifies that particular subscriber line. Responsive thereto, the scanner slows momentarily to provide a relatively long time frame during which the requested switch path is completed through the network. Thereafter, the scanner resumes its normal high speed operation. This way, the overall system may operate at a much higher speed than would be possible if each time frame must be long enough to complete a connection.

In accordance with another aspect of this invention, the telephone numbers of certain commonly called lines are pre-stored in a conference call control circuit. For a subscriber to place a conference call with subscribers having their numbers stored in this control circuit, a digit is sent to identify that control circuit. Immediately, that control circuit begins to seize all available registers and other common equipment necessary to complete a connection to each conferenced subscriber line. For example, if the conference control circuit has five numbers pre-stored therein, that control circuit immediately seizes five registers. This way, all five registers act simultaneously and all five connections are completed virtually simultaneously. Thus, there is no need to wait for the completion of a first conferenced subscriber line connection before proceeding to the completion of the next conferenced subscriber line connection.

In accordance with yet another aspect of this invention, each subscriber station is provided with a number of keys, such as eighteen keys, for example. Each key connects in coded combination (e.g., 2 out of 4 with +, −, or 0 potentials) to lines extending from the subscriber station to the telephone switching office. The key controlled indications are directed to an address store which may be any convenient form of a signal patching board, for example. According to selective connections made in the patching board, a desired called subscriber line is rung. This way, there is no need to dial a full complement of digits to complete a connection to any of the eighteen lines designated by the keys.

The above mentioned and other features and objects of this invention and the manner of obtaining them will become more apparent, and the invention itself will be best understood by reference to the following description of an embodiment of the invention taken in conjunction with the accompanying drawings, in which.

Figures 4, 4A:
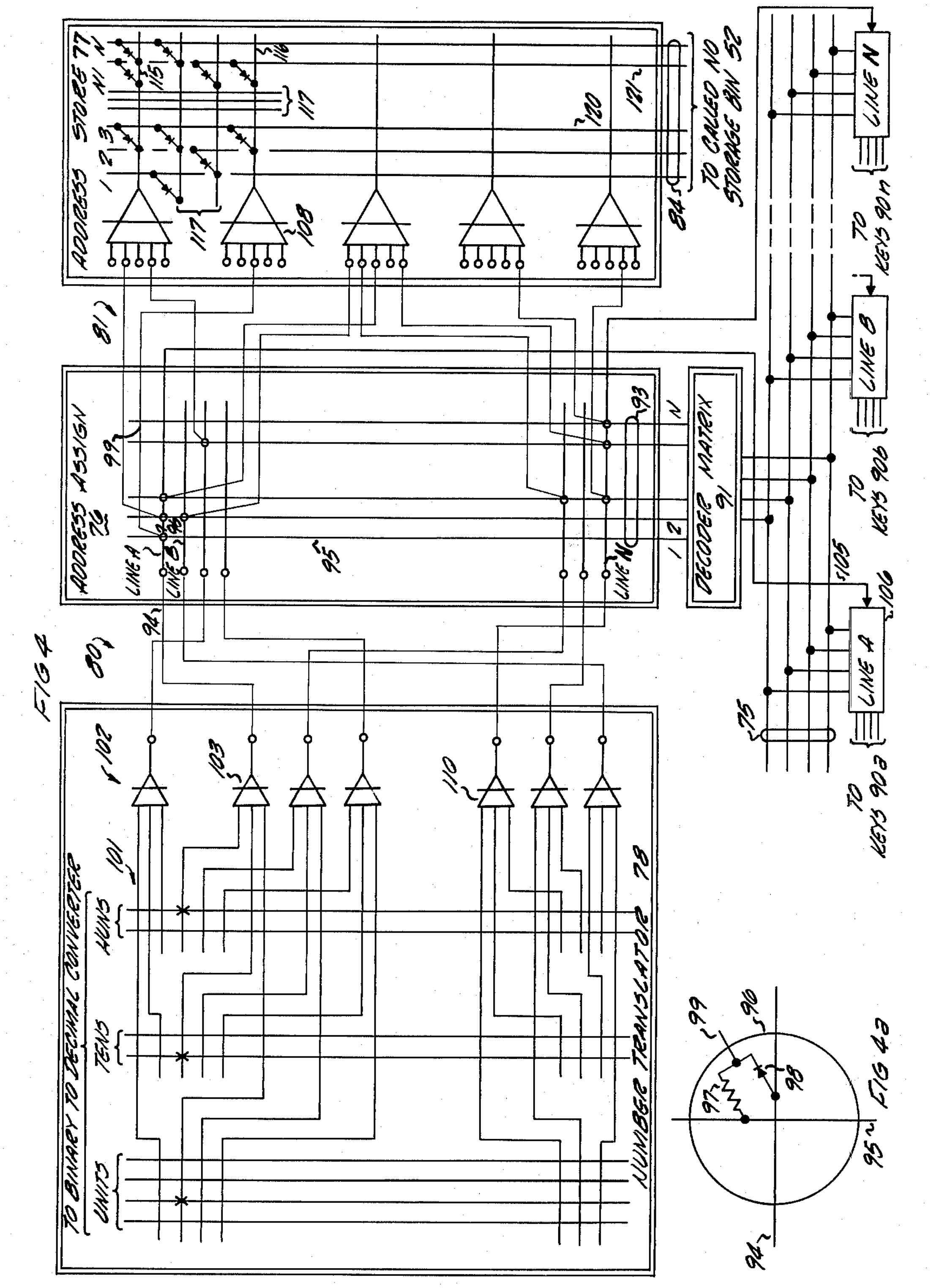
FIG. 4 is a second block diagram showing how subscriber lines may be provided with a number of keys having individual called numbers arbitrarily and semipermanently associated therewith.
Figure 5:
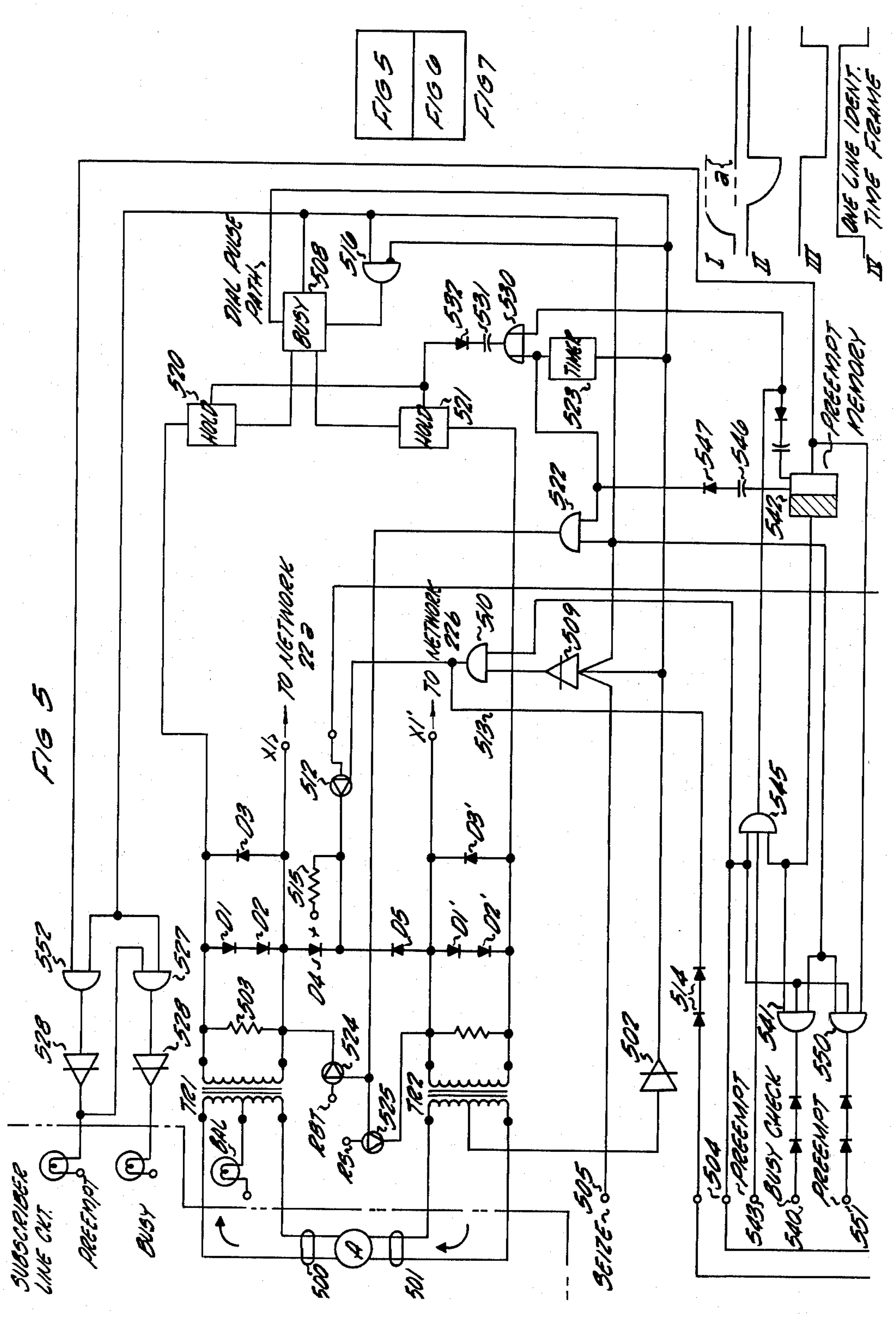
Figure 6:
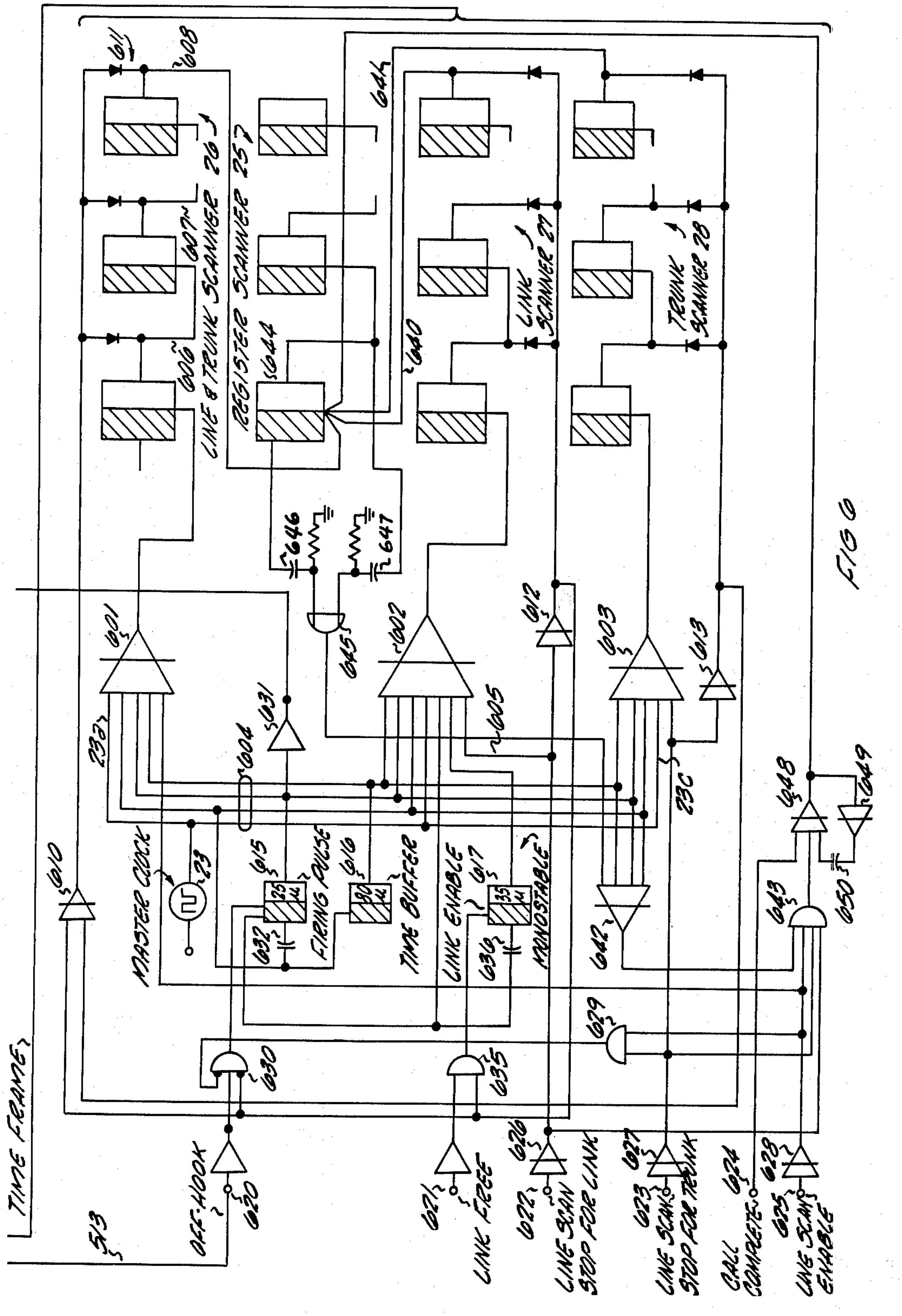

FIG. 4*a* shows the details of a patching cord plug used in FIG. 4;

FIGS. 5 and 6 are logic diagrams showing a two speed scanner incorporating the principles of the invention; and FIG. 7 shows the manner in which FIGS. 5 and 6 should be joined to provide a complete and understandable circuit.

For a showing of a complete telephone system embodying principles exploited by this invention, reference may be made to the above identified Arseneau, Bereznak and Osborn application. Accordingly, the accompanying drawings and the following description are limited to those features which are essential to an understanding of the invention.

GENERAL DESCRIPTION

*Subscriber calls*

Figures 1, 3:
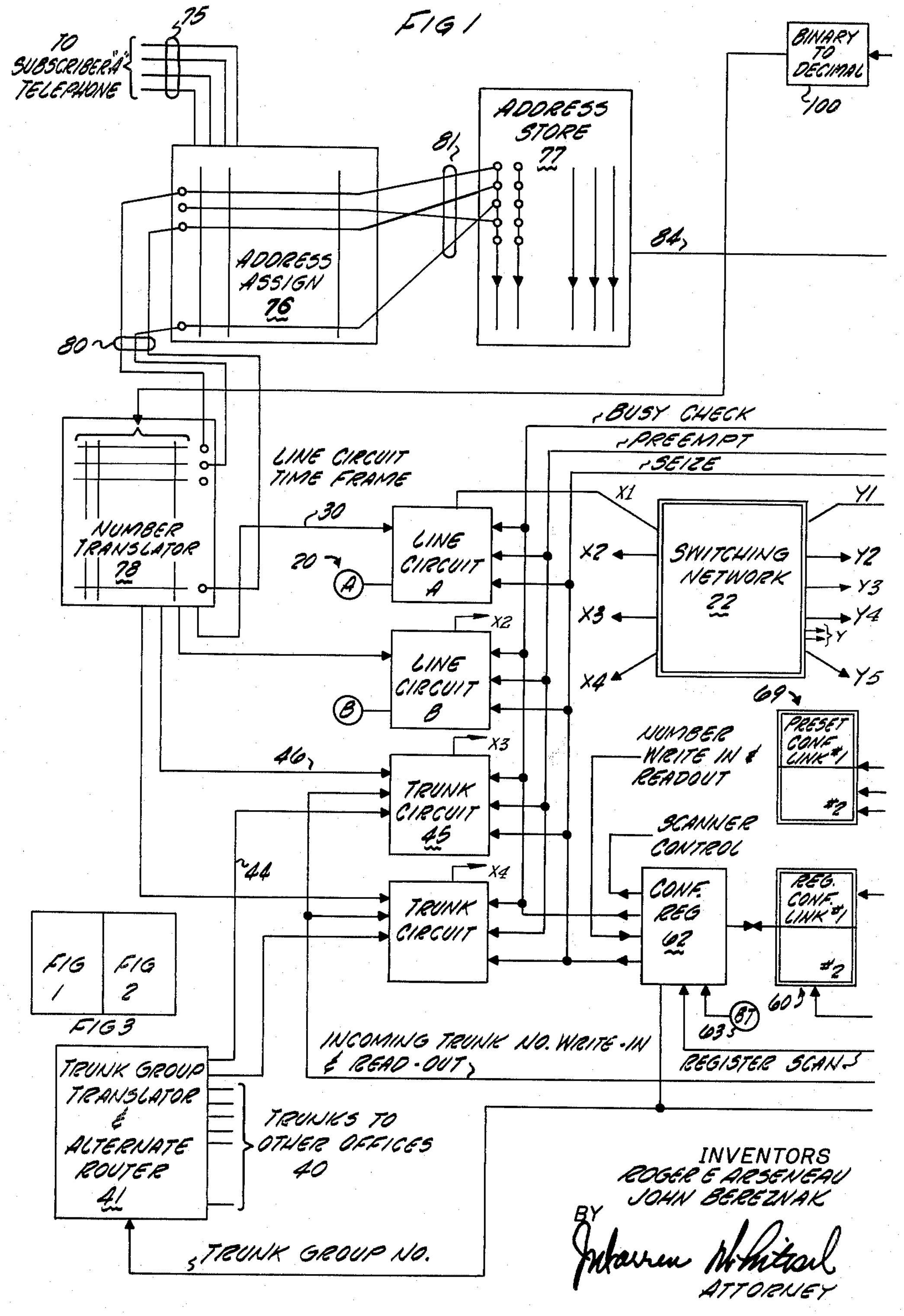
FIGS. 1 and 2 are a block diagram showing an exemplary telephone system.
FIG. 3 shows the manner in which FIGS. 1–2 should be joined to provide a complete block diagram.
Figure 2:
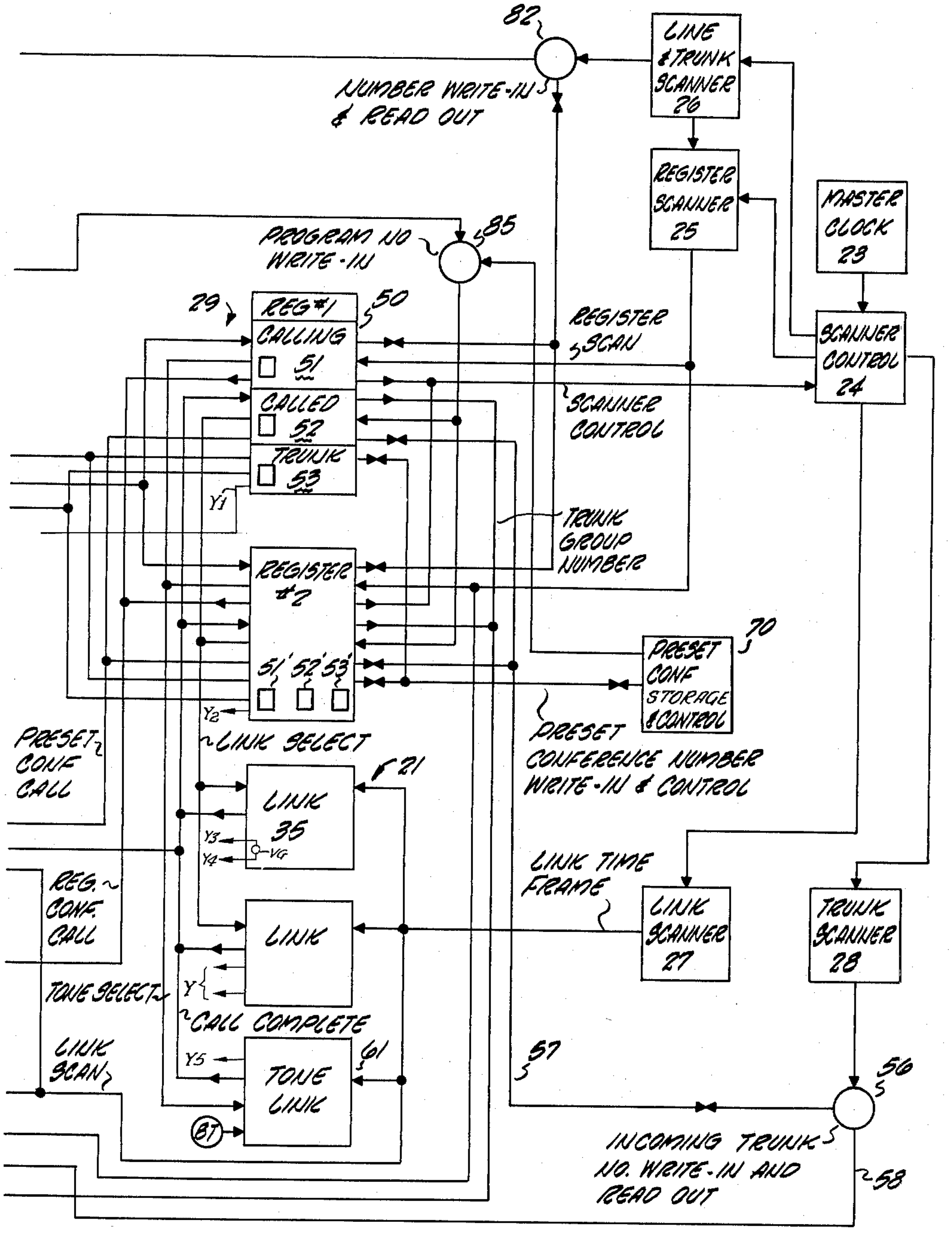

In general, the FIGS. 1, 2 block diagram shows an electronic switching system including a plurality of subscriber lines 20, a plurality of link circuits 21, and a switching network 22 for selectively connecting any one of the lines with an allotted or assigned one of the links. Each subscriber line, link, and register in the system is identified by a cyclically recurring time frame produced under the control of a master clock circuit 23. Normally, this clock drives a free-running scanner 24–28 at an extremely high rate of speed which allows time for the detection of calling conditions but no other switching functions. If a subscriber line goes off-hook, a signal is detected during the time frame that identifies that line, and the scanner immediately slows to provide a relatively long time frame, thus giving added time during which a switch path is completed through the switching network 22. The paths are completed under control of a plurality of registers 29, usually on a one register per call basis.

In greater detail, each subscriber line 20 terminates in a line circuit at the switching center. For example, line A terminates in line circuit A. For voice transmission, each circuit connects to the network 22 at an individual line side point of access—line A might connect to point X1, for example. Other similar connections are made at X2–X4; however, they are omitted in the drawing for the sake of clarity. For control purposes, each line circuit connects to many common busses (here designated BUSY CHECK, PREEMPT, and SEIZE) and to individual line identifying LINE CIRCUIT TIME FRAME busses.

When the time frame busses are marked, the corresponding line circuit is enabled to extend a connection through the network 22 to an idle register circuit. Thus, if line A is "off-hook" when time frame bus 30 is marked, line circuit A may mark the line side of the network 22 at point X1. If the REGISTER #1 is then idle, a point such as Y1 is marked on the link side of network 22. [For clarity, only connection Y1 is shown in detail; other connections (not shown) join points Y2–Y5.] Thereupon a path fires from line circuit A through the network 22 to the REGISTER #1. The register then utilizes the BUSY CHECK and the SEIZE busses to complete a connection to a called line if it is idle. If the called line is busy, and if executive over ride is required, the register utilizes the PREEMPT and SEIZE busses to over ride the busy condition and extend a connection to the called line. After the register is ready to complete a connection, it transfers the call to an idle link circuit and then drops its connection to the line.

Each link circuit 21 includes all means necessary to supervise and hold a speech path after it has been established under control of the register. Thus, the link 35, for example, might connect to link side points of access Y3, Y4 for giving voice transmission. (Any number of other similar connections are symbolically shown at Y.) The link 35 also connects to a plurality of common control busses—here designated LINK TIME FRAME, LINK SELECT, and CALL COMPLETED.

The LINK SELECT bus controls the transfer of the call from a register to the link circuit then identified via the LINK TIME FRAME conductor. If idle, that link applies markings to the link side of the network, and switch paths fire to calling and called lines. For example, if line A is calling, line B is called, and link 35 is idle, the switch path extends from points X1, X2 through network 22 to points Y3, Y4, respectively. Link 35 then closes a voice gate VG to join points Y3, Y4 and complete the voice path. Then link 35 pulses the CALL COMPLETE bus to release the controlling register, which is thus made free to control another call.

Obviously the results would be chaotic if every switch path tries to fight its way through the network 22 with absolutely no reference to the need for completing any other switch paths be they calling or called paths. Therefore, order is brought to the system by a clock controlled assignment of available equipment.

The master clock 23 is any suitable source of cyclically recurring pulses such as a free-running flip-flop circuit, for example. These pulses normally drive a scanner through a continuously recycling number of steps at a high rate of speed which—for convenience of expression—may be termed the "system speed." The output of the scanner assigns each circuit in the system in accordance with its individually identifying time frame. Since the scanner has a number of functions to control and further to facilitate this description, the scanner is shown in FIG. 2 as divided into a scanner control circuit 24 which drives a register scanner 25, a line and trunk scanner 26 (the calling appearance), a link scanner 27, and a trunk scanner 28 (the called appearance). Despite this division, the scanner may be a single unitary device. The scanner control 24 directs the clock pulses from source 23 to drive the individual scanners, as required. For example, the register scanner 25 is driven when it is necessary to assign a register to serve the next call, and the line and trunk scanner 26 is driven when it is necessary to serve the needs of lines or calling trunks. The exact nature of these scanners will become more apparent from a study of an exemplary scanner shown in FIGS. 5 and 6 and of the above identified Arseneau, Bereznak and Osborn application.

*Trunk calls*

Trunk calls are processed somewhat as subscriber calls are processed except that some form of trunk or group hunting must be provided. This entails trunk identification.

In greater detail, all interoffice trunks 40 connect through a trunk group translator and alternate router 41 to the line side of network 22. For example, trunks 40 connect through router 41 and conductor 44 to trunk circuits. The output side of a trunk circuit 45 may connect to the line side point of access X3, for example, to network 22. The particular trunk circuit 45 is identified by time frame pulses applied to the conductor 46. Thus, every trunk essentially appears as a subscriber line appears, insofar as network 22 is concerned.

Incoming trunk calls are relatively simple. For example, an incoming trunk call from a distant office appears on a specific trunk line in group 40. The router 41 selects an idle trunk circuit 45 and places a call exactly as a subscriber places a call.

Outgoing calls are processed differently from calls to subscriber lines because trunk hunting is required. That is, each trunk in the group of trunk lines 40 may extend to the same distant office. A calling subscriber would not care whether a call is extended over one trunk or some other trunk in group 40. Therefore, the object of trunk hunting is to seize any idle one of the trunks in group 40. However, once a trunk is seized, it may become necessary to perform a supervisory or some other function. Thus, despite the fact that any idle trunk may be seized initially, it becomes necessary to identify which trunk of a group is seized.

To understand this need for trunk hunting, it may be well to review briefly the manner in which subscriber calls are extended through the above identified Arseneau, Bereznak, Osborn system. First, a subscriber station (such as A) goes off-hook. Then, the associated line circuit marks its point of access X1 during the time frame which identifies line A. Thereupon, a path fires through the network 22 to point Y1 and an idle register 50. The register stores in a memory storage device 51 a numerical indication of the time frame during which the path fires. This is, of course, an identification of the calling line.

Next, the register 50 returns dial tone. The calling subscriber dials the called number which is stored in the register storage circuit 52. Then, the register marks an idle link, such as 35, via the LINK SELECT bus. Thereafter paths fire through the network from both the calling and called lines identified by the numbers stored in the registers storage circuits 51, 52 to the link 35. Finally, the link 35 marks the CALL COMPLETE bus to release the register, and link 35 thereafter holds the connection for the duration of the call.

Trunk hunting is provided on outgoing calls. More particularly, the calling subscriber station goes off-hook; a path fires; a calling number is stored in register circuit 51; dial tone returns; a called number is stored in register circuit 52. This time, however, the stored called number identifies a distant office—not a subscriber line. Thus, the register 50 marks a particular TRUNK GROUP NUMBER bus which corresponds to the number of the called distant office, which number is stored in register circuit 52. The router 41 then selects (in any suitable manner) an idle trunk circuit (such as 45) associated with a trunk line to the called distant office. After the idle trunk is selected, the router 41 artificially marks all other trunks busy for the duration of the trunk circuit time frame. Obviously, the artificially busy trunk circuits cannot then be selected by any call. Thereafter, during the time frame which identifies the selected trunk circuit 45, a pulse appears on bus 46. Then a path fires from the idle trunk circuit 45 through the network 22 to the register 50. Since this path fires during the time frame that identifies the selected trunk circuit 45, the identity of the selected trunk is known.

The storage circuit 53 records the identity of the seized trunk circuit 45 when the trunk scanner 28 pulses through a gate circuit 56 simultaneously with the completion of the fired path. When the register 50 is ready to transfer this trunk call to a link circuit, it pulses gate 56 via conductor 57 during the time frame identified by the code stored in circuit 53, which, of course, identifies trunk circuit 45. This in turn, pulses the conductor 58 and the trunk circuit 45. A path now fires from both the calling subscriber line and the seized trunk circuit to a link circuit. Thus, one identified trunk in group 40 has been individualized to a particular call.

*Conference call*

The invention contemplates furnishing equipment providing for two distinct types of conference calls. One type is the usual or regular conference call set up at a normal speed. The other is a high speed emergency conference call, between preassigned persons, set up at the push of a single button.

In greater detail, the system includes a plurality of registers 29—here designated registers #1, #2, and perhaps others. Normally, one register controls the extension of a single call. For example, as described above, normally a calling subscriber line goes off-hook; a calling path fires through network 22; register 50 records a calling number and returns dial tone; a called number is received; a path fires through the network to a link. This time, however, the called number indicates not that a called line is wanted, but that a regular conference call is wanted.

The register 50 responds to the called number by pulsing the REG CONF. CALL bus. One of the regular conference links #1 or #2 (60) is then assigned by the link scanner 27 to provide the necessary conference connections. If REG CONF. LINK #1 is idle, a path fires from the calling line through the network to the conference link during the time frame which identifies that link. If it is busy, a path fires upon occurrence of a time frame of a different and idle conference link. If all conference links are busy, a path fires into the tone link 61 and the calling subscriber receives busy tone.

Assuming that conference link #2 is seized, it calls in a conference register (one of which is shown at 62) then identified by a time frame pulse on the REGISTER SCAN bus. If all conference registers are busy, source 63 sends busy tone through the conference link to the calling subscriber. If any registers are idle, the register 62 returns dial tone, and the calling subscriber dials the number of the first desired conference subscriber line. Then the register 62 causes the conference link circuit #2 to seize the first called line. Dial tone is returned. Next, the calling subscriber dials the second conference number, and the register causes a seizure of the second line. The process repeats until all desired conference lines are seized and connected together via any desired conferencing circuit. Thus, it is clear that normally the same register 50 controls the establishment of a call regardless of whether it is a regular call or a conference call.

Means are provided for seizing a number of available registers to complete certain conference calls simultaneously. In greater detail, during times of emergency, it may be necessary to call many designated individuals into one conference call. For example, a fire might require a conference call to each of three different fire departments; a police department, and a hospital. In like manner, an enemy attack might require a conference call between the military, fire and police departments, civilian defense, and political authorities.

Here again, the calling party either pushes a button or dials a certain number which identifies the particular conference call that is desired. The regular register 50 recognizes the number and seizes an idle preset conference link 69 via the PRESET CONFERENCE CALL bus.

Simultaneously, via the PRESET CONFERENCE NUMBER WRITE AND CONTROL bus, register 50 seizes PRESET CONFERENCE STORAGE AND CONTROL circuits 70. The storage circuit 70 permanently stores the numbers of the conference parties necessary to complete the indicated call. The number of the seized preset conference link 69 is written into temporary storage in circuit 70.

Preferably, circuit 70 immediately seizes as many registers in the group of registers 29 as there are numbers stored in circuit70. Thus, if five numbers are stored in circuit 70, five registers are seized. One number is read-out of a first storage circuit 70 and written into the called number storage circuit 52 of a first register 29. A second number is read-out of storage from circuit 70 and into a second register in the register group 29. The process repeats and every number is read-out of circuit 70 and into an individual register in group 29. Thus, for an emergency conference a different register operates responsive to each number permanently stored in circuit 70 and all conference connections are completed virtually simultaneously. Depending upon system and user needs, the circuit 70 may either wait for idle registers or preempt busy registers. Or some circuits such as 70 may wait and others may preempt.

*Push button call*

Throughout the following portion of this specification and in the claims reference is made to "push buttons"; however, the intention is that any fast operating sending means is covered by the term. For example, knobs, levers or the like will function as push buttons function.

Means are provided for manually sending any of a plurality of arbitrarily assigned signals from each subscriber station to certain central office equipment during a time frame which represents a calling subscriber line. In the central office, means are provided for interpreting these signals in accordance with the time frame during which they are received. Thereupon, the signal is applied, according to the interpretation, to immediately generate a signal for seizing a called subscriber line.

The equipment for providing this feature is shown in the block diagram of FIGS. 1, 2 and in FIG. 4. This equipment includes four busses 75 common to all subscriber lines in the office, an address assign circuit 76, an address store circuit 77, and a number translator circuit 78.

Means are provided for making arbitrary connections to generate called line identification signals according to the needs of a calling subscriber. For example, patch cords 80 arbitrarily connect any output of the number translator 78 to any input of the address assign circuit 76. Likewise patch cords 81 connect any output of the address assign circuit 76 to any input of the address store circuit 77. Broadly, the address store 77 is a device having means for making arbitrary, semi-permanent storage of subscriber numbers. The address assign circuit 76 converts signals on subscriber marked busses 75 into signals for selectively energizing any input or combinations of inputs to the address store circuit 76. The number translator circuit 78 relates time frames to subscriber line push buttons or keys, thus interpreting subscriber sent signals according to the time frames during which such signals are sent. Thus, a subscriber presses a key to mark busses 75 in a coded combination. The time frame signals sent through translator 78 both activate the key markings and select one output of address assign circuit 76. This, in turn, selects one address stored in circuit 77. Thereupon signals are sent over cable 84 to gate 85 (FIG. 2) and into a called number storage circuit 52. Thereupon, the register containing the storage circuit 52 completes a connection to the called party.

In greater detail, associated with each subscriber line are a number of keys 90 (FIG. 4) for selectively applying one of three potentials ("+," "—," or "0") to the busses 75 and in a combination such as a 2-out-of-4 code. A decoder matrix 91 of any conventional design applies the potentials on busses 75 to any one of N number input terminals 93 in the address assign circuit 76. Thus if the first and second of the busses 75 are at "+" potential, input "1" of terminals 93 might be marked, for example. If the same busses are at "—" potential, perhaps input "2" is marked. Of course, many other codes may mark any other of the N number of inputs 93, as required.

Physically, the address assign circuit 76 includes an array of horizontal and vertical multiples associated with crosspoint jacks of any convenient design. For example, the horizontal 94 and vertical 95 are here shown as associated with a crosspoint jack 96. The plug adapted to fit into jack 96 contains a two input AND gate. Thus, when a plug 96 is inserted into a crosspoint jack, the plug conducts as a two input "AND" gate provided that both intersecting multiples 94, 95 are energized simultaneously.

The plug 96 is shown in exemplary detail in FIG. 4*a*. In essence, the plug includes a voltage divider comprising a resistor 97 and a diode 98. Here it indicates conductivity when the horizontal multiple 94 is ground. Thus, if a ground potential appears on a horizontal 94 and a negative potential appears on vertical 95, the forward drop voltage of the diode 98 appears on output conductor 99. If no potential (or negative potential) appears on horizontal 94, and a negative potential is on 95 then diode 98 is reverse biassed and output conductor 99 stands at the potential of vertical 94. The conductor 99 is at an output potential only when both multiples are energized.

Means are provided for interpreting the coded signals appearing on busses 75 in accordance with the time frame during which such signals appear. More specifically, the line and trunk scanner 26 (FIG. 2) is free running device which drives translator 78 through a binary to decimal converter 100 (FIG. 1). During one time frame, this converter selectively energizes units, tens, and hundreds busses 101 (FIG. 4) in accordance with a particular subscriber line identification. During the next time frame, converter 100 selectively energizes these busses in accordance with the next line identification. In like manner, these busses are selectively energized during every time frame. Therefore, it is obvious that a particular NOR gate 102 may be caused to conduct during any single time frame and only during that time frame. For example, the NOR gate 103 may be arbitrarily connected to a second UNITS bus, a first TENS bus, and a second HUNS bus, as shown by the "X" marks in FIG. 4. Preferably, these connections are made by pins so that they may be changed quickly and easily.

During the time frame when converter 100 de-energizes the translator busses marked by "X," NOR gate 103 conducts to energize horizontal 94 in the address assign circuit 76. Thus, a signal feeds over conductor 105 to enable a gate circuit 106 individual to line A. If any of the keys **90*a* are pushed, a coded signal appears on busses 75, and the de-coder matrix 91 marks a corresponding input 93 of circuit 76. If, for example, input "1" is marked, vertical 95** is energized.

The coincidence of a mark potential on horizontal 94 and vertical 95 causes an output at crosspoint jack 96. Thus, a signal feeds over a patching cord 99 to a logic gate 108.

During other time frames, other of the NOR gates 102 enable other lines to send coded signals from keys **90*b* . . . 90*n* over busses 75. Thus, if NOR gate 110 conducts, for example, line N sends its coded signals from keys 90*n* over busses 75 to matrix 91**.

The address store circuit 77 is any suitable device adapted for a rapid insertion or change of marking devices. For example, a commercially available matrix manufactured by ITT Kellogg, a division of the International Telephone and Telegraph Corporation, provides a number of intersecting busses embedded in plastic. A window is formed in the plastic at every intersection of these busses. The window allows room for insertion of a small diode. When in place in a window, a diode interconnects the busses which intersect at that window. Thus, any desired connections may be made across selected busses of the address store circuit by the simple expedient of inserting or removing diodes. For example, the horizontal bus 115 is arbitrarily shown as diode connected to the vertical busses 3, N–1, and N. The horizontal bus 116 is arbitrarily shown as diode connected to vertical busses 3 and N–1. Similarly, any number of available coded combinations may be made. Moreover, the busses 117 indicate that any number of horizontals or verticals may be provided, as required.

In the above assumed example, a subscriber on line A keyed a signal which energized conductor "1" of input 93 when the time frame signals from converter 100 were removed from the 101 busses indicated by an "X" mark. The NOR gate 103 conducted; an AND function occurred at crosspoint 96; conductor 99 was marked. The logic circuit 108 energizes horizontal 116 and signals feed over conductors 120, 121 of cable 84. This happens simultaneously with the extension of a call through the network 22 to an idle register 50. When the call reaches the register, that register momentarily connects its called number storage circuit 52 to cable 84. If the vertical busses 120, 121 (for example) are then marked, a corresponding number is stored in circuit 52. The register detects this storage and immediately completes the call to the subscriber line identified by the diode connections between horizontal 116 and verticals 120, 121.

DETAILED DESCRIPTION

Next reference is made to FIGS. 5, 6 for a disclosure of those portions of the system required for an understanding of the invention. The remainder of the system is shown in the above identified Arseneau, Bereznak, Osborn application.

First, reference is made to FIG. 6 which shows a two speed scanner. It includes the register scanner 25, the pertinent portions of the line and trunk scanner 26, the link scanner 27, and the trunk scanner 28. In each case, the scanner is a series of flip-flop circuits normally driven at a relatively high "system speed" by a master clock 23—which may be a free-running multivibrator, for example. That is, each of the flip-flop chains has its input connected to the output of a NOR gate 601–603. Normally, each input to these NOR gates is de-energized. The result is that the NOR gates 601–603 switch "off" and "on" (in unison) at the system speed as the voltage at the master clock outputs 23*a*, 23*b*, 23*c* change.

To slow a scanner, it is only necessary to energize another input of the appropriate NOR gates 601–603, thus preventing it or them from turning "on" when the master clock output potential disappears from the conductors 23*a*, 23*b*, or 23*c*. Thus, all scanners are slowed when any of the common NOR gate inputs 604 are energized. Individual scanners are slowed when individual NOR gate inputs are energized. Thus, a scanner normally provides output pulses at the system speed. However, a long pulse at the input of any of the NOR gates 601–603 slows the time frame associated with that NOR gate during which the long pulse appears.

To inhibit any scanner, a steady state marking is applied to all of its output terminals. For example, the scanner 26 negatively marks its output terminals 606–608 in binary code. To inhibit the scanner 26, an inverter 610 applies a negative voltage through the diodes 611 to all of the output terminals 606–608. In like manner, the output of inverter 612 inhibits the scanner 27, and the output of inverter 613 inhibits the scanner 28.

Although scanners 26 and 28 are shown as two separate devices, for purposes of clarity of explanation, it is most economical to provide one unitary scanner. Otherwise it might be necessary to duplicate parts for incoming and outgoing trunk calls. Thus, the parts of the unitary scanner are controlled individually according to a desired logic function.

*Time frame.*—As shown by the curves in the lower right-hand corner of FIG. 5, each time frame consists of three parts. For purposes of illustration, the duration of each time frame is given below; however, it should be understood that these time periods are cited by way of example only—other suitable time periods could be provided also.

Wave form I shows a link enable pulse which is the end-marking voltage applied to the network 22 at a point (Y). It is a slow rising positive pulse applied during the first 35 microseconds of a time frame. The dotted line *a* indicates that this end-marking voltage may last for any convenient period of time.

After 35 microseconds, an end-marking (called a "firing pulse") appears at a point X in network 22 (FIG. 1). This firing pulse has a slow rising negative going potential and lasts for 25 microseconds, as shown by the wave form II of FIG. 5.

After the termination of the firing pulse, there comes a buffer time period shown by the wave form III. During this buffer time period, no path can try to fire through the network 22. This allows time for all charges to decay, all stored charge carriers to disappear, and everything in the network to reach its quiescence condition.

Hence, it is apparent that the time frame (wave form IV) consists of three parts: a 35 microsecond link enable period, a 25 microsecond firing pulse, and an 80 microsecond buffer time period. These time periods are produced under the control of three monostable flip-flops 615, 616, 617. The operation of these flip-flops is explained below.

*Register control over scanner.*—The register functions somewhat as a master mind to control the establishment of a call. After the call is once established, the register transfers the supervisory control over the call to a link or trunk circuit. Then, the register is freed to serve the next call.

To accomplish this control, in part, the register connects to the scanner at a number of terminals shown on the left hand side of FIG. 6. Of these, terminal 620 is marked when a subscriber line is off-hook in a calling condition during the time frame which identifies that line. The terminal 621 is marked by any link circuit which is idle while it is being scanned. The terminal 622 is marked by the register when it is ready to transfer a connection to a link. The terminal 623 is marked when the register is ready to complete a trunk call. The terminal 624 is marked whenever the register is ready to complete a connection to a called line. Finally, an idle register ready to be assigned to serve the next call marks terminal 625.

Before any of these terminals 620–625 are marked, inverters 626–628 are "on." The AND gate 629 conducts, and the gate 630 is inhibited. While an idle register is being scanned, the terminal 625 is energized so that inverter 628 turns "off," and AND gate 629 ceases conducting. The gate 630 is no longer inhibited.

*Line circuit.*—The line circuit (FIG. 5) is of the four wire variety having a transmit pair 500 connected to the subset transmitter and receive pair 501 connected to the subset receiver. In addition, the subscriber station includes a number of lamps, one of which goes out when a connection is about to be preempted during executive right-of-way and another of which goes out when a line is busy. A ballast lamp BAL, in series with the talking battery, compensates for variations in line resistance; however, it also shows when a line is in use, thus serving as a visual aid to maintenance. Moreover, the lamp burns out on certain extremely high voltage conditions (e.g. a lightning stroke), thus giving circuit breaking protection. The subscriber line may also include any other appropriate equipment such as a dial, a hook switch, a ringer, speakers, or microphones.

The line circuit also includes transformers TR1, TR2 for terminating the subscriber line, the network points of access X1, X1' and logic control circuitry. The transformers TR1, TR2 are terminated in a characteristic impedance as shown at 503, for example. Three diodes D1, D2, D3 are also connected across each transformer output coil to protect against surges. The network 22 requires a holding current to maintain established connections. Therefore, a small potential, which acts as a diode bias, appears at point X1 when a switch path is completed. In view of this bias one diode D3 is sufficient in one direction of electrical current, but two diodes D1, D2 in series are required for the other direction of current flow.

With the foregoing description of system principles, component details, and general control functions in mind, it is thought that the reader will better appreciate the invention by the following description of circuit operation.

First to be described is a typical local call. To place this call, the subscriber at station A (FIG. 5) removes a receiver or hand set (not shown) to close hook switch contacts in a well known manner. These contacts close a loop across the conductors 500, 501 and produce a signal which turns "off" inverter 502.

Each time that scanner 26 produces the time frame which identifies subscriber station A, terminal 504 is marked. Also, if the system is in a condition such that a path can be fired through the network, seize terminal 505 is marked from the register. If the line is busy, gate 508 energizes the right-hand input of a NOR gate 509. If the line is idle, this input is not energized. Here the assumption is that station A is calling in which case it is idle and off-hook, so NOR gate 509 switches "on" when the pulse appears at terminal 505. When the calling line time frame appears, coincidence occurs at AND gate 510 which conducts.

The AND gate 510 output enables the gate 512. The output of AND gate 510 also feeds over the off-hook bus 513 which is common to the exchange. The diodes 514 prevent feed back between subscriber lines connected to the bus 513.

*Line scanning.*—Means are provided for momentarily showing the scanner to provide a relatively long time frame. That is, responsive to the potential on the bus 513, inhibit gate 630 conducts to trigger the flip-flop 615. For its 25 microsecond monostable time period, flip-flop 615 energizes an input of the three NOR gates 601, 602, 603. These NOR gates switch "off" and remain "off" to stop the scanners for the 35 microsecond period. Flip-flop 615 also energizes amplifier 613 and therefore, the input of gate 512.

Recall that AND gate 510 is conducting to enable gate 512. Therefore, the amplifier 631 output appears at points X1, X1' as end markings for the network. Since this is a four wire system, the network 22 is duplicated—one network 22*a* for the transmit pair 500, another network 22*b* for the receive pair 501. The diodes D4, D5 isolate the two networks and yet allow passage of the end-marking potential. The battery and resistor 515 provide holding battery for fired paths.

At the end of 25 microseconds, the monostable flip-flop 615 returns to normal. In doing so it de-energizes the NOR gates 601–603 to advance the scanner and pulse flip-flop 616 via capacitor 632. Before capacitor 632 charges, flip-flop 616 switches to its unshaded side to energize an input of the NOR gates 601–603. After 80 microseconds the flip-flop 616 returns to its unshaded side to de-energize the NOR gates 601–603.

These NOR gates thereafter switch "on" and "off" to drive the scanner flip-flops at the system speed responsive to the master clock 23 output.

The advantages of this operation should now be apparent. That is, the master clock normally drives the scanner at an extremely high rate of speed. Necessarily the time frames are extremely short. When a path is ready to fire through the network, the line circuit pulses the off-hook bus 513. Immediately the scanner slows to produce a relatively long 105 microsecond time frame. During the first 25 microseconds of this long time frame, a path fires through the network 22. During the last 80 microseconds of this long time frame, the network returns to quiescence. Then the scanner resumes its normal high speed operation. Thus, there is no need for operating the system slowly to allow a firing time in each and every time frame. The entire system may be speeded greatly, and a firing period will be provided only when required.

*Link scanning.*—After the called number digits are stored in the register 50 (FIG. 1), the register pulses its LINK SELECT bus. This causes a potential to appear at point 622 and the inverter 626 switches "off." The conductor 605 is de-energized to allow NOR gate 602 to switch "on" and "off" under control of the master clock 23. Thus, the link scanner 27 scans the links. If any link is idle when it is scanned, it responds by pulsing a common conductor and point 621 during its time frame.

The output of inverter 626 also causes inverter 612 to switch states (e.g. changes output polarity). This energizes an inverter 610 which also switches states to hold the line scanner 26 output 606–608 at a fixed potential (via diode 611, for example). This inhibits the transmission of line identifying time frame pulses. Thus, the line scanner becomes ineffective. Conversely, when the inverter 612 switches states the link scanner 27 becomes effective. The inverter 612 output also inhibits gate 630 to preclude any seizure of control over the scanner by a calling line. Finally, the inverter 612 energizes the lower input of AND gate 635.

If the link being scanned is idle and pulsing a common conductor, a potential appears at terminal 621. There is coincidence and AND gate 635 conducts. The link allot flip-flop 617 switches "on" to energize an input of NOR gate 602. This NOR gate is held "off" so that it no longer follows the master clock pulses. During the next 35 microseconds, the link applies an end-marking potential to a "Y" point on network 22. At the end of this 35 microsecond period, flip-flop 617 returns to its shaded side. While capacitor 636 charges NOR gate 602 is held "off" at its third from bottom input and flip-flop 615 is switched "on." By the time that capacitor 636 is charged, flip-flop 615 has switched to its unshaded side to hold NOR gate 602 "off."

The register 50 is marking terminals 505, 504 in the called line circuit to indicate that a connection is required. If the called line is busy, circuit 508 is conducting; NOR gate 509 does not switch "on"; AND gate 510 does not conduct; nothing further happens in the called line circuit; busy tone returns to the calling subscriber. If the called line is idle, circuit 508 does not conduct; NOR gate 509 does switch "on"; AND gate 510 conducts; a firing pulse reaches points X1, X1' of the called line, and a path fires through the network as explained above in connection with the calling line.

After the path has fired through the network, the buffer flip-flop 616 operates and then the scanner resumes normal speed operation.

If the path fails to reach a link, the master clock 23 pulses the NOR gate 602 after all the flip-flops 615–617 switch to their unshaded sides. This drives the link scanner at a high rate of speed. When the scanner encounters a busy link, it steps at the high rate of speed. When it encounters an idle link, a potential at point 621 slows scanning, and another path tries to fire through the network.

As with line scanning, the link scanner operates at an extremely high rate of speed, slowing only when terminal 621 is marked to indicate the possibility that a path might fire through the network.

*Called line (on-hook, off-hook operation).*—The on-hook, off-hook, and answer supervision is provided as follows. Assume subscriber station A is on-hook, no loop is completed, inverter 502 has no input; therefore, it has an output signal. This output signal inhibits gate 516 and prevents busy circuit 508 from conducting. The output signal also energizes NOR gate 509 to prevent the passage of a firing pulse through gate 512. On incoming calls, the register applies one voltage level signal to seize terminal 505 so that NOR gate 509 will switch "on" only if inverter 502 is also "off." On outgoing calls the register applies a different voltage level signal to terminal 505 so that NOR gate 509 will switch "on" even though inverter 502 is also "on."

If a call fires through the network at a time when the associated line is on-hook, inverter 502 is "on." The hold circuits 520, 521 supply current and hold the completed paths, and busy gate 508 switches "on" if it was not already "on." At AND gate 522, the potential on seize bus 505 coincides with the output of a normally "on" timer circuit 523. The AND gate 522 conducts and enables gates 524, 525. Ring back tone passes through gate 524 to the calling line, and ring signal passes through gate 525 to the called line.

When a subscriber station goes off-hook, the inverter 502 switches "off." The timer 523 switches "off" to terminate the AND function at gate 522, and thereby trip ringing. Gate 516 is no longer inhibited, and busy gate 508 switches "on" if it was not already "on." The busy gate output feeds back through gate 516 to hold it "on." The busy gate output also feeds into an AND gate 527. If inverter 528 has no input, its output coincides at AND gate 527 with the busy signal to provide an output which switches inverter 528 "off." A green BUSY lamp goes out.

Dial pulses cause inverter 502 to switch "off" and "on." Busy gate 508 repeats these pulses through the hold circuits 520, 521 to the network, then the register. The timer 523 does not time out during dial pulses; however, if off-hook conditions persist too long (i.e. longer than dial pulse periods), timer 523 does time out and pulse hold circuits 520, 521 via OR gate 530, capacitor 531, and diode 532. The path through the network releases.

*Preempt.*—Some subscribers have the right to preempt or gain executive-right-of-way on certain other lines. Some subscribers have lines which can not be preempted. And, any line which has been preempted is marked to prevent preemption by any other call. The above identified Arseneau, Bereznak, Osborn application explains how the register recognizes preempt calls.

A normal busy line is marked by a potential on a busy bus 540 during the time frame which identifies the busy line. This marking results from a coincidence of three conditions at the input of AND gate 541. The three conditions are a line identification time frame pulse at terminal 504, an output from busy circuit 508, and a non-preempted memory signal from the shaded side of flip-flop 542.

To preempt a line, the register recognizes the normal busy signal and marks a preempt terminal 543. A coincidence of this mark, a time frame, and a non-preempted memory signal from flip-flop 542 causes AND gate 545 to conduct. This causes flip-flop 542 to switch to its unshaded side to store a do-not-preempt memory. The AND gate 545 also causes OR gate 530 to pulse hold circuits 520, 521 and release the paths through the network.

When flip-flop 542 switches to its do-not-preempt memory, a signal passes through a capacitor 546, diode 547 and AND gate 522 to gate out ring signal and ring back tone as a preempt notice to the subscribers. Also, a signal from flip-flop 542 (unshaded side) coincides at AND gate 550 with a time frame pulse and a busy (508) signal to pulse a preempt bus 551. The register will not allow preemption of any call if the bus 551 is pulsed during the time frame which identifies that call. Finally, the signal from flip-flop 542 coincides at AND gate 552 with the busy (508) signal. Inverter 528 switches "off"; the PREEMPT light goes out; AND gate 527 no longer conducts; inverter 528 switches "on"; the BUSY lamp lights.

Subscribers whose calls can not be preempted are given telephones with special signals. The form of signal is not important; it could be a tone source, a push button, a "spotter" dial, a special directory number code, or some other suitable signal. In any event, the register recognizes the signal and pulses the preempt bus 543 to switch the flip-flop 542 to its do-not-preempt side. The call can not thereafter be preempted.

*Register scanning.*—The register scanner 25 also operates at a high rate of speed, slowing only when some good will come from it. In greater detail, the register scanner 25 is normally driven over conductor 608 at the end of each line scan, over conductor 640 at the end of each link scan, or over conductor 641 at the end of each trunk scan. In addition, the register scanner is driven at a high rate of speed when the register identified by a register time frame is busy and can not immediately perform a system function.

For an understanding of a busy register advance, assume that previous conditions are such that NOR gate 642 and AND gate 643 are "on." Also assume that the register scanner 25 is about to step. The reason for stepping is not important; perhaps any one of the conductors 608, 640, 641 is energized.

If the flip-flop 644 goes to its shaded side, OR gate 645 is pulsed while capacitor 646 conducts. If flip-flop 644 goes to its unshaded side, OR gate 645 is pulsed while capacitor 647 conducts. In one exemplary system, each of these capacitors charges in ten microseconds. Therefore, OR gate 645 conducts for ten microseconds.

The register scanner 25 normally steps at a relatively high speed. In greater detail, while OR gate 645 conducts; NOR gate 642 switches "off." The upper input of AND gate 643 is de-energized, AND gate 643 goes "off," and NOR gate 648 switches "on." Inverter 649 switches "off" and capacitor 650 discharges during a five microsecond period in the exemplary system. The NOR gate 648 will stay switched "on" until capacitor 650 discharges sufficiently. When it is so discharged, NOR gate 648 no longer conducts, if the AND gate 643 conducts. When the NOR gate 648 switches "off," flip-flop 644 again changes sides, OR gate 645 conducts, and the register scan drive cycle repeats. Hence, it is seen that the normal register scanning is at a relatively high speed, fixed by the timing of the capacitors 646, 647, 650.

The register scanner slows when it scans a register ready to complete a useful call function. The particular call function is not important; it could be the origination of a call, the seizure of a called line, the preemption of a call or something else. For example, assume that the scanned register is idle and ready to serve an unanswered calling line. If so, the scanned register marks terminal 625 to turn "off" the inverter 628. This holds the AND gate 643 "off" and keeps the NOR gate 648 from turning "off." Therefore, the register scanner is not driven from the NOR gate 648. Instead, the register scanner stops until either a path fires from a line to the register or a line scan is completed. If the path fires, the register removes the potential from the point 625, inverter 628 switches "on," AND gate 643 switches "on," NOR gate 648 switches "off," and the register scanner 25 steps. If the line scan ends before a path fires, the register scanner is stopped when the line scanner energizes conductor 608.

To complete a call to a called line or trunk, a register waits for its time frame, and then marks the terminal 624. This holds the NOR gate 648 "off" to stop the register scanner until the called path fires through the network to the register.

*Trunk scanning.*—In like manner, a mark at terminal 623 stops the register scanner until the correct trunk call function is completed. The mark at the terminal 623 also causes the inverter 627 to switch "off" and the inverter 613 to switch "on." This feeds back to a signal to NOR gate 610 which inhibits the line and trunk scanner 26. The trunk scanner is now driven by the master clock 23 to step at a high rate of speed.

Perhaps it would be well to review the manner in which the trunk calls are extended so that this feature may be better understood. On outgoing trunk calls, the system seizes any idle trunk to a distant office. Thus, the register sends a signal through the alternate router 41 (FIG. 1) which causes the marking to appear at terminal 622. Thereupon, the trunk scanner 28 starts looking for an idle trunk—any idle trunk in the group marked by the alternate router 41.

When an idle trunk is found, that trunk circuit marks a network point (such as X4), and a path fires to the register just as any calling line fires a path. The register stores the number of the calling trunk line, just as all calling line numbers are stored. When the register has completed its function, the call is transferred to a line circuit just as all calls are transferred to all link circuits. This time, however, the "calling" line is a specific trunk circuit—not just the first idle trunk circuit. Thus, the specific trunk number read out of scanner 28 is pulsed into scanner 26. Again, scanners 26, 28 are the same device; they are here shown separately merely to emphasize the dual function.

The system has, of course, many advantages, the most obvious of which is extremely high speed operation. It is well adapted to push button operations—either for calling any of a number of arbitrarily assigned directory numbers or for calling pre-assigned conference subscribers. Moreover, the assignment of these numbers is very flexible, permitting quick and easy changes. In addition, the high speed searching, slowing only for useful functions eliminates some useless searching. This eliminates some noise which has been encountered in the past. This also allows many of the systems shown to be incorporated into a trunking network to provide tandem calls. Also, the entire system has been simplified in many effects to accomplish an overall reduction in costs. Of course, there are many other advantages which will also occur to those skilled in the art. Therefore, these advantages are cited by way of example only.

While the principles of the invention have been described above in connection with specific apparatus and applications, it is to be understood that this description is made only by way of example and not as a limitation on the scope of the invention.

We claim:

1. An electronic switching system comprising a plurality of subscriber lines, a plurality of link control circuits including voice gates for completing connections, a switching network for selectively connecting any of said lines with an assigned one of said links, means comprising a source of relatively short high speed time frames for identifying each of said lines to detect a request for a switch path from a line through said network to a link, and means responsive to the detection of a request for a switch path for momentarily slowing said source to provide a relatively long low speed time frame during which said requested path is completed.

2. The system of claim 1 and means operated during said long time frame for providing a link side end-marking to said network, a line side end-marking to said network, and a buffer time period, and means responsive to the end of said buffer time period for causing said source to resume said high speed operation.

3. The system of claim 1 wherein each of said lines has number sending means comprising a plurality of push buttons associated therewith, means for individually assigning directory numbers to said push buttons on an arbitrary basis, and means responsive to operation of said push buttons for extending connections through said networks to the lines identified by said push buttons.

4. An electronic switching system comprising a plurality of subscriber lines, a plurality of link control circuits including voice gates for completing connections, a switching network for selectively connecting any of said lines with an assigned one of said links, means comprising a source of relatively short high speed time frames for identifying each of said lines to detect a request for a switch path from a line through said network to a link, means responsive to the detection of a request for a switch path for momentarily slowing said source to provide a relatively long low speed time frame during which said requested path is completed, preset conference means having the directory number of conference lines permanently stored therein, means responsive to signals received over said subscriber lines for seizing said conference means, means operated by said seized conference means for seizing a number of available registers, means for reading the permanently stored conference line numbers out of said conference means into said seized register means, each seized register means receiving one read-out conference line number, and means whereby each of said registers connects the line identified by its stored conference number into a conference call, whereby all desired conference lines are seized substantially simultaneously.

5. An electronic switching system comprising a plurality of subscriber lines, a plurality of link control circuits having voice gates for completing communication paths, a switching network for selectively connecting any of said lines with an assigned one of said links, means comprising a source of relatively short high speed time frames for identifying each of said lines to detect a request for a switch path through said network, means responsive to the detection of a request for a switch path for momentarily slowing said source to provide a relatively long low speed time frame during which said requested path is completed, a plurality of busses common to said system, a plurality of manual sending means associated with said lines for selectively marking said busses in accordance with the directory numbers of predetermined ones of said lines, said marking being applied to said busses during the time frame which identify the associated lines, means jointly responsive to said markings and said time frame signals for generating called line identification signals, and means responsive to said generated signals for extending a connection to said called line.

6. An electronic switching system comprising a plurality of time frame identified subscriber lines, means normally responsive to off-hook conditions on any of said lines for extending connections through said system during a time frame that identifies said off-hook line, register means responsive to switch control signals received from said line for normally controlling the extension of connections between a calling and a called line, means associated with each of said lines for sending a manually selected one of many special signals, and means jointly responsive to said manually selected signal and to an occurrence of a time frame identifying the line on which said manual selection is made for immediately completing a connection between a calling line and a called line.

7. An electronic switching system comprising a plurality of time frame identified subscriber lines, means normally responsive to off-hook conditions on any of said lines for extending connections through said system during a time frame that identifies said off-hook line, register means responsive to switch control signals received from said line for normally controlling the extension of connections between a calling and a called line, means associated with each of said lines for sending a manually selected one of many special signals, means jointly responsive to said manually selected signal and to an occurrence of a time frame identifying the line on which said manual selection is made for immediately completing a connection between a calling line and a called line, an end-marked, current controlled switching network for selectively completing said connections through said system, means for providing said time frames comprising a source of relatively short high speed time frames for identifying each of said lines, means responsive to the detection of a request for a switch path through said network for momentarily slowing said source to provide a relatively long low speed time frame during which said requested path is completed, said relatively long time frame comprising a link enable pulse, a firing pulse, and a buffer time period, and means responsive to the end of said buffer time period for causing said source to resume said high speed operation.

8. The system of claim 7 wherein said time frame source comprises three cascaded monostable circuits, means responsive to operation of a first of said monostable circuits for generating said link enable pulse, means responsive to operation of a second of said monostable circuits for generating said firing pulse, and means responsive to the operation of each of said monostable circuits for inhibiting said source.

9. The system of claim 6 wherein said manual sending means comprises a plurality of push buttons associated with said subscriber line, means for individually assigning directory numbers to said push buttons on an arbitrary basis, a plurality of common busses, and means responsive to operation of any one of said push buttons for extending coded signals over said common busses during the time frame which identifies the subscriber line where the push button is located.

10. The system of claim 6 and a plurality of register circuits, means for normally setting up all connections required to complete a call under the control of a single one of said registers, a preset conference means having the directory numbers of predetermined conference lines permanently stored therein, means responsive to signals received over said subscriber lines for seizing said conference means, means operated by said seized conference means for seizing a number of registers, means for reading the permanently stored conference line numbers out of said conference means and into said seized register means, each seized register means receiving one read out conference line number, and means whereby each of said registers connects a different one of said lines into a conference call, whereby all desired conference lines are seized substantially simultaneously.

11. A high speed electronic switching telephone system comprising a pool of register means, means including a switching network for normally completing all connections required for a single call under the control of a single register, at least one conference call control means having a plurality of directory numbers permanently stored therein, and means responsive to a signal identifying said control means for assigning a different register to operate responsive to each permanently stored called number, thereby completing connections virtually simultaneously to the plurality of lines identified by said called numbers.

12. The system of claim 11 wherein each of said lines has number sending means comprising a plurality of push buttons associated therewith, means for assigning individual directory numbers to each of said push buttons on an arbitrary basis, and means responsive to operation of said push buttons for extending connections through said networks to the lines identified by said push buttons.

13. An electronic switching telephone system comprising a plurality of subscriber lines, a plurality of trunk lines extending to other offices, means for identifying each of said subscriber and trunk lines by cyclically recurring time frames, means responsive to an outgoing call to a given one of said offices for seizing an idle one of the trunks leading to said other office, means for artificially busying all trunks except the seized trunk, means responsive to seizure of said idle trunk for storing an indication of the directory number of said one trunk, and means responsive to said stored indication for thereafter directing switch control signals to said one trunk.

14. An electronic switching telephone system comprising a plurality of subscriber lines, a plurality of trunk lines extending to many different offices, means for identifying each of said lines by relatively short, high speed, cyclically recurring time frames, means responsive to a call to one of said offices for selecting an idle trunk and artificially busying all non-selected trunks leading to any of said offices, whereby the selected one of the trunks may be seized and no other trunk may be seized, means for thereafter providing a relatively long, low speed time frame comprising a line enable pulse, a firing pulse, and a time buffer pulse for extending a connection to the selected trunk, means responsive to the extension of said connection to said other trunk for storing an indication of said one trunk, and means responsive to said stored indication for thereafter directing all functions associated with said call to said one trunk.

15. The system of claim 14 wherein each of said lines has a number of single motion fast operating sending means associated therewith, means for individually assigning directory numbers to said sending means on an arbitrary basis, and means responsive to operation of said sending means for extending connections to the line identified by said sending means.

References Cited by the Examiner

UNITED STATES PATENTS

| | | | |
|---|---|---|---|
| 2,787,663 | 4/57 | Pharis | 179—18 |
| 2,852,612 | 9/58 | Baker et al. | 179—18 |
| 2,951,908 | 9/60 | Malthaner et al. | 179—18 |
| 3,116,375 | 12/63 | Harr et al. | 179—18 |
| 3,133,994 | 5/64 | Zarouni | 179—18 |

ROBERT H. ROSE, *Primary Examiner*.

WALTER L. LYNDE, *Examiner*.